United States Patent
Tsen et al.

(10) Patent No.: US 9,317,251 B2
(45) Date of Patent: Apr. 19, 2016

(54) EFFICIENT CORRECTION OF NORMALIZER SHIFT AMOUNT ERRORS IN FUSED MULTIPLY ADD OPERATIONS

(71) Applicant: NVIDIA Corporation, Santa Clara, CA (US)

(72) Inventors: Charles Tsen, Portland, OR (US); Adam Dreyer, Portland, OR (US)

(73) Assignee: NVIDIA CORPORATION, Santa Clara, CA (US)

( * ) Notice: Subject to any disclaimer, the term of this patent is extended or adjusted under 35 U.S.C. 154(b) by 155 days.

(21) Appl. No.: 13/732,237

(22) Filed: Dec. 31, 2012

(65) Prior Publication Data

US 2014/0188963 A1  Jul. 3, 2014

(51) Int. Cl.
 *G06F 7/483* (2006.01)
 *G06F 7/499* (2006.01)
 *G06F 7/544* (2006.01)

(52) U.S. Cl.
 CPC .......... *G06F 7/483* (2013.01); *G06F 7/49936* (2013.01); *G06F 7/5443* (2013.01)

(58) Field of Classification Search
 None
 See application file for complete search history.

(56) References Cited

U.S. PATENT DOCUMENTS

| | | |
|---|---|---|
| 4,620,217 A | 10/1986 | Songer |
| 4,639,886 A | 1/1987 | Hashimoto et al. |
| 4,648,045 A | 3/1987 | Demetrescu |
| 4,700,319 A | 10/1987 | Steiner |
| 4,849,923 A | 7/1989 | Samudrala et al. |
| 4,862,392 A | 8/1989 | Steiner |
| 4,901,224 A | 2/1990 | Ewert |
| 4,974,198 A | 11/1990 | Ishii |
| 5,185,856 A | 2/1993 | Alcorn et al. |
| 5,197,140 A | 3/1993 | Balmer |
| 5,357,604 A | 10/1994 | San et al. |
| 5,491,496 A | 2/1996 | Tomiyasu |
| 5,577,213 A | 11/1996 | Avery et al. |

(Continued)

FOREIGN PATENT DOCUMENTS

| | | | |
|---|---|---|---|
| JP | 62080785 A2 | 4/1987 | |
| JP | 05150979 A2 | 6/1993 | |

(Continued)

OTHER PUBLICATIONS

"Interleaved Memory." Dec. 26, 2002. http://www.webopedia.conn/TERM/1/interleaved_memory.html.

(Continued)

*Primary Examiner* — David H Malzahn

(57) ABSTRACT

A method for correcting a shift error in a fused multiply add operation. The method comprises adjusting a normalized floating-point number before performing a shift error correction to produce an adjusted normalized floating-point number, and correcting a shift error in the adjusted normalized floating-point number. The correcting the shift error comprises shifting a mantissa of the adjusted normalized floating-point number in one direction. A fused multiply add module comprising a normalizer module, a compensation logic, and a round. The normalizer module is operable to normalize a floating-point number to produce a normalized floating-point number. The floating-point number is normalized based upon an estimated quantity of leading zeros. The compensation logic is operable to manage a correction of a shift error in the normalized floating-point number. The rounder is operable to correct the shift error with a mantissa shift in only one direction.

28 Claims, 15 Drawing Sheets

(56) References Cited

U.S. PATENT DOCUMENTS

| | | |
|---|---|---|
| 5,581,721 A | 12/1996 | Wada et al. |
| 5,655,132 A | 8/1997 | Watson |
| 5,805,875 A | 9/1998 | Asanovic |
| 5,850,572 A | 12/1998 | Dierke |
| 5,923,862 A | 7/1999 | Nguyen et al. |
| 5,941,940 A | 8/1999 | Prasad et al. |
| 5,957,997 A | 9/1999 | Olson |
| 5,977,977 A | 11/1999 | Kajiya et al. |
| 6,118,452 A | 9/2000 | Gannett |
| 6,173,366 B1 | 1/2001 | Thayer et al. |
| 6,333,744 B1 | 12/2001 | Kirk et al. |
| 6,351,806 B1 | 2/2002 | Wyland |
| 6,353,439 B1 | 3/2002 | Lindholm et al. |
| 6,466,222 B1 | 10/2002 | Kao et al. |
| 6,496,537 B1 | 12/2002 | Kranawetter et al. |
| 6,526,430 B1 | 2/2003 | Hung et al. |
| 6,557,022 B1 | 4/2003 | Sih et al. |
| 6,624,818 B1 | 9/2003 | Mantor et al. |
| 6,636,221 B1 | 10/2003 | Morein |
| 6,636,223 B1 | 10/2003 | Morein |
| 6,778,181 B1 | 8/2004 | Kilgariff et al. |
| 6,806,886 B1 | 10/2004 | Zatz |
| 6,839,828 B2 | 1/2005 | Gschwind et al. |
| 6,922,771 B2 | 7/2005 | Kim et al. |
| 6,924,808 B2 | 8/2005 | Kurihara et al. |
| 6,947,053 B2 | 9/2005 | Malka et al. |
| 6,980,209 B1 | 12/2005 | Donham et al. |
| 6,999,100 B1 | 2/2006 | Leather et al. |
| 7,280,112 B1 | 10/2007 | Hutchins |
| 7,298,375 B1 | 11/2007 | Hutchins |
| 7,477,260 B1 | 1/2009 | Nordquist |
| 7,499,962 B2 | 3/2009 | Tang et al. |
| 7,659,909 B1 | 2/2010 | Hutchins |
| 7,710,427 B1 | 5/2010 | Hutchins et al. |
| 7,928,990 B2 | 4/2011 | Jiao et al. |
| 7,941,645 B1 | 5/2011 | Riach et al. |
| 8,046,399 B1 | 10/2011 | Inaganti |
| 8,106,914 B2 | 1/2012 | Oberman et al. |
| 8,606,840 B2 | 12/2013 | Ahmed |
| 8,671,129 B2 | 3/2014 | Brooks et al. |
| 8,694,572 B2 | 4/2014 | Samy |
| 8,805,915 B2 | 8/2014 | Yu et al. |
| 8,805,917 B2 | 8/2014 | Mohamed et al. |
| 2002/0129223 A1 | 9/2002 | Takayama et al. |
| 2003/0115233 A1 | 6/2003 | Hou et al. |
| 2004/0114813 A1 | 6/2004 | Boliek et al. |
| 2004/0130552 A1 | 7/2004 | Duluk, Jr. et al. |
| 2004/0230774 A1* | 11/2004 | Schwarz et al. ............ 712/222 |
| 2005/0122330 A1 | 6/2005 | Boyd et al. |
| 2005/0135433 A1 | 6/2005 | Chang et al. |
| 2005/0223195 A1 | 10/2005 | Kawaguchi |
| 2006/0028469 A1 | 2/2006 | Engel |
| 2006/0155964 A1 | 7/2006 | Totsuka |
| 2006/0177122 A1 | 8/2006 | Yasue |
| 2006/0179093 A1* | 8/2006 | Powell et al. ............... 708/204 |
| 2007/0279408 A1 | 12/2007 | Zheng et al. |
| 2007/0285427 A1 | 12/2007 | Morein et al. |
| 2011/0231460 A1* | 9/2011 | Ahmed ........................ 708/205 |
| 2013/0007075 A1* | 1/2013 | Oliver et al. ................ 708/203 |
| 2013/0332501 A1 | 12/2013 | Boersma |
| 2014/0067895 A1 | 3/2014 | Wang et al. |
| 2014/0188963 A1* | 7/2014 | Tsen et al. .................... 708/209 |

FOREIGN PATENT DOCUMENTS

| | | |
|---|---|---|
| JP | 07084965 A2 | 3/1995 |
| JP | 11053187 A2 | 2/1999 |
| JP | 2000047872 A2 | 2/2000 |
| JP | 2002073330 A2 | 3/2002 |
| JP | 2004303026 A2 | 10/2004 |
| WO | 2005114646 A2 | 12/2005 |

OTHER PUBLICATIONS

Pirazzi, Chris. "Fields, F1/F2, Interleave, Field Dominance And More." Nov. 4, 2001. http://lurkertech.com/lg/dominance.html.

Hennessy, et al., Computer Organization and Design: The Hardware/Software Interface, 1997, Section 6.5.

Moller, et al.; Real-Time Rendering, 2nd ed., 2002, A K Peters Ltd., pp. 92-99, 2002.

* cited by examiner

Figure 3A

| row | Datapath Case | Effective Operation | Source of normalization shift amount | Normalization Restriction | Norm shift error | Pre-Round modification to: datapath, exp | Rounder + normalization behavior modification to: datapath, exp | Net impact on: datapath, exp |
|---|---|---|---|---|---|---|---|---|
| 1 | IQAD | X | LZA | X | 0 | none, exp-- | none, exp++ | none, none |
| 2 | IQAD | X | LZA | X | -1 | none, exp-- | mant<<1, none | mant<<1, exp-- |
| 3 | QAD | Addition | Addend align_shift | X | 0 | mant>>1, none | mant<<1, none | none, none |
| 4 | QAD | Addition | Addend align_shift | X | -1 | mant>>1, none | none, exp++ | mant>>1, exp++ |
| 5 | QAD | Subtraction | Addend align_shift | X | 0 | none, exp-- | none, exp++ | none, none |
| 6 | QAD | Subtraction | Addend align_shift | X | 1 | none, exp-- | mant<<1, none | mant<<1, exp-- |
| 7 | ASZ(denormal) | X | Addend align_shift | 0 | 0 | none, exp-- | none, exp++ | none, none |
| 8 | ASZ(denormal) | X | Addend align_shift | 1 | 0 | none, exp-- | none, exp++ | none, none |
| 9 | ASZ(normal) | X | Addend align_shift | 1 | 0 | none, exp-- | none, exp++ | none, none |
| 10 | QAD denormal | Addition | Addend align_shift plus leading zeros | 0 | 0 | mant>>1, none | mant<<1, none | none, none |
| 11 | QAD denormal | Addition | Addend align_shift plus leading zeros | 0 | 1 | mant>>1, none | none, exp++ | mant>>1, exp++ |
| 12 | QAD denormal | Subtraction | Addend align_shift plus leading zeros | 0 | 0 | none, exp-- | none, exp++ | none, none |
| 13 | QAD denormal | Subtraction | Addend align_shift Plus leading zeros | 0 | -1 | none, exp-- | mant<<1, none | mant<<1, exp-- |
| 14 | QAD denormal | X | Addend align_shift | 1 | 0 (based on exp) | none, exp-- | none, exp++ | none, none |

Normalization Logical Scheme

Figure 4B

**Result of Addition (A*B)+C**                    ␣ 404

```
                                                401 Single Precision Carry Boundary
Bit            77 7766 6666 5555 55|44 44 44 4444 3333 3322 2222 1111 1111 1100 0000 0000
position:      32 1098 7654 3210 98|76.54 3210 9876 5432 1098 7654 3210 9876 5432 1098 7654 3210
                                   |
SUM:                               |1000_00_00.00_0000_0000_0000_0111_1000_0000_0000_0000_0000_0000
```

Result of Normalization                    ␣ 406

```
                                                401 Single Precision Carry Boundary
Bit            77 7766 6666 5555 55|44 44 44 4444 3333 3333 3322 2222 1111 1111 1100 0000 0000
position:      32.1098 7654 3210 98|76 54 3210 9876 5432 1098 7654 3210 9876 5432 1098 7654 3210
                                   |
NORM:                 10.0000_0000_0000_0000_00|01_11 10 0000_0000_0000_0111_1000_0000_0000_0000_0000_0000
```

(Normalize – from row 4 of Figure 3: mant>>1, none: normalization shift amount is from addend: 19-1)

Figure 4C

Rounding and Error Correction:

```
Bit        2 2 222 1111 1111 1100 0000 0000
position:  4 3.210 9876 5432 1098 7654 3210
---------------------------------------------
RND:       1_0.000_0000_0000_0000_0000_0000 + rounding bits (Rounder right shift, increment exponent, since MSB is set)  // final_exp(69) - r_exp(68) + 1

FINAL:     1.000_0000_0000_0000_0000_0000   : Final Mantissa
```

**Result of Subtraction (A*B) - C**

```
                                                                    501 Single Precision Carry Boundary
Bit            77 7766 6666 5555 55 44 44 4444 3333 3333 3322 2222 2222 1111 1111 1100 0000 0000
position:      32 1098 7654 3210 10 98 76 54 3210 9876 5432 1098 7654 3210 9876 5432 1098 7654 3210

SUBTRACTION RESULT:       1_1111_11 11_11.00 0000_0000_0000_0111_1000_0000_0000_0000_0000_0000
```

Result of Normalization

```
                                                                    501 Single Precision Carry Boundary
Bit            77 7766 6666 5555 55 44 44 44 4444 3333 3333 3322 2222 2222 1111 1111 1100 0000 0000
position:      32 1098 7654 3210 10 98 76 54 3210 9876 5432 1098 7654 3210 9876 5432 1098 7654 3210

NORM:    01.1111_1111_1100_0000_0000_00 00 00 0000_0000_0000_0000_0000_0000_000
```

(Normalize - from row 6 of Figure 3: (none, exp--) - norm shift amount is directly from addend before subtraction: 16)
(Exponent: r_exp(69) = prod_exp(25+35) - norm_amt(16) + radix_pt_movement(26)-adjustment(1))

Figure 5C

Rounding and Error Correction:

```
Bit            2 2 222 1111 1111 1100 0000 0000
position:      4 3.210 9876 5432 1098 7654 3210
```

RND:           0 1.111_1111_1110_0000_0000_0000 + rounding bits (Rounder does nothing in this example since MSB is clear)   Final exponent(69) = r_exponent(69)

FINAL:         1.111_1111_1110_0000_0000_0000  :  Final Mantissa

— 508

Figure 6A (A * B) - C, where:

A=1.000_0000_0000_0000_1111_0000 * $2^{25}$

B=1.000_0000_0000_0000_0000_0000 * $2^{35}$

C=1.111_1111_1000_0000_0000_0000 * $2^{(25+35-1)}$

Single Precision
Normalization Point
(3 * mantissa precision) + 2

Single Precision
Carry Boundary

```
bit       77 7766 6666 5555 55 44 44 4444 3333 3322 2222 1111 1100 0000 0000
Position: 32 1098 7654 3210 98 76.54 3210 9876 5432 1098 7654 3210 9876 5432 1098 7654 3210

PRODUCT:                     1.00 0000 0000 0000 0111 1000 0000_0000_0000_0000_0000_0000
ADDEND:                      0.11_1111_1100_0000_0000_0000_00
```

Note: all bits above the carry boundary are 1, and bits below generate a carry (here: from bit position 46).

In this multiplication dominated scenario, the upper 24 bits are zero.

The following are simplified examples that may represent inputs to the 3:2 compressor.

Result of Normalization when the LZA produced AN: ⎯606

```
                                                    Single Precision
                                                    Carry Boundary
                                                         ↓
bit       77 7766 6666 5555 5555 55|44 44 44 4444 3333 3333 2222 2222 1111 1111 1100 0000 0000
Position: 32.1098 7654 3210 9876 5432 10|98 76 54 3210 9876 5432 1098 7654 3210 9876 5432 1098 7654 3210

NORM:     10.0000_1111_0000_0000_0000_00|00_00_00 0000_000

(Normalize by 37 and decrement exponent by 1.
r_exp(48) = prod_exp (25+35) - norm_amt(37) + radix_pt_movement(26) - adjustment(1)
```

Rounding and Error Correction: ⎯608

```
bit       22 222 1111 1111 1100 0000 0000
Position: 43.210 9876 5432 1098 7654 3210

RND:      10.000_0111_1000_0000_0000_0000 + rounding bits (Rounder right shift, increment exponent, since MSB is correctly set)
final_exp(49) = r_exp(48) + 1
─────────────────────────────────────────────────────
FINAL:       1.000_0011_1100_0000_0000_0000  :  Final Mantissa
```

Figure 6D

Result of Normalization when the
LZA produced AN - 1:
                                                              Single Precision
                                                              Carry Boundary ↙  ⌐610

```
bit       77 7766 6666 5555 5555 55|44 44 44 4444 3333 3333 2222 2222 1111 1111 1100 0000 0000
Position: 32.1098 7654 3210 9876 5432 10|98 76 54 3210 9876 5432 1098 7654 3210 9876 5432 1098 7654 3210

NORM:     01.0000_0111_1000_0000_0000_00|00_00 00_0000_000
```

(Normalize by 36 and decrement exponent by 1.
r_exp(49) = prod_exp (25+35) - norm_amt(36) + radix_pt_movement(26) - adjustment(1)

Rounding and Error Correction:                                    ⌐612

```
bit       22 222 1111 1111 1100 0000 0000
Position: 43.210 9876 5432 1098 7654 3210

RND:      01.000_0011_1100_0000_0000_0000 + rounding bits
```

(Rounder - no right shift or exponent adjustment, to achieve "mant<<1, none", since MSB (bit 24) is clear)
final_exp(49) = r_exp(49)

FINAL:    1.000_0011_1100_0000_0000_0000  :  Final Mantissa

EFFICIENT CORRECTION OF NORMALIZER SHIFT AMOUNT ERRORS IN FUSED MULTIPLY ADD OPERATIONS

TECHNICAL FIELD

The present disclosure relates generally to the field of computer processors and more specifically to the field of floating-point units of a computer processor.

BACKGROUND

Conventional computer systems may include one or more floating-point units that may be used to perform operations on floating-point numbers (computer encodings that represent real numbers). Exemplary floating-point units may perform mathematical operations such as: addition, subtraction, multiplication, division, and square root. A floating-point unit may also be known as a math coprocessor. A variety of floating-point numbers may be used (e.g., single precision and double precision floating-point numbers). In one exemplary embodiment, a single precision floating-point number is a 32 bit binary number comprising a sign bit, an 8 bit exponent, and a 24 bit significand (e.g., mantissa or significant digits). In one optimized single precision embodiment, only the first 23 bits of a mantissa are stored, while the 24th bit, or most significant bit (msb), is assumed to be 1 in normal cases. As discussed herein, such floating-point numbers require normalization, such that the most significant bit of the mantissa will be 1.

In one embodiment, a floating-point unit comprises a fused multiply add (FMA) unit. An exemplary FMA unit may perform a combined multiplication and addition operation, such as: $(A*B) \pm C$. In one embodiment, the FMA may operate on single or double precision floating-point numbers. Further, combining a multiplication and an addition operation into a single step may allow the two operations to be performed with only a single rounding (rather than a rounding after the multiplication and a rounding after the addition).

In one embodiment, a normalization unit may be used to normalize the result of the multiplication add operation before it is rounded. An exemplary final mantissa (i.e., the significant digits of a final resulting floating-point number) of an FMA for non-special case results (e.g., infinity, NaN, and zero) must either be normalized (i.e., no leading zeros with a biased exponent greater than zero), or denormal (i.e., a biased exponent of zero). In one exemplary embodiment, a normalization unit converts a floating-point number into a normalized form. For example, the following binary floating-point numbers, 1100, $1100 \times 2^{-2}$, and $0.1100 \times 2^{+3}$, when converted to their normalized forms equal: $1.100 \times 2^{+3}$, $1.100 \times 2^{-1}$, and $1.100 \times 2^{+2}$, respectively. When normalizing a binary floating-point number, the most significant bit of the mantissa will be 1. In exemplary embodiments, as discussed herein, when normalizing the intermediate result (e.g., (A*B)+C)) from an FMA, the extent of a radix point shift and a corresponding exponent adjustment will be dependent upon the number of leading zeros of an intermediate results mantissa. The FMA intermediate result is an FMA result after multiplication and addition, but before normalization and rounding. For example, an 8-bit mantissa of 00001010 may be normalized to 10100000, with a corresponding adjustment to the exponent.

An amount by which the mantissa may be normalized is influenced by the exponents of the floating-point number inputs and the number of leading zeroes of the FMA's exemplary intermediate result. Exemplary conventional hardware optimizations may be introduced to reduce FMA unit latencies, but such optimizations may introduce errors into the normalization amount.

A first exemplary source of error may come from a leading zero anticipator (LZA) module which performs a fast estimation of the quantity of leading zeros in parallel with the FMA's completion adder to determine the normalization amount. As discussed herein, an LZA may rapidly estimate a quantity of leading zeros before a completion adder, rather than waiting for the completion adder to produce a sum with the actual number of leading zeroes. An exemplary normalization shift amount as determined by an LZA may differ by 1 from a true quantity of leading zeros. In one embodiment, the LZA may introduce errors of −1, while in another embodiment, the LZA may introduce errors of +1. This error may be introduced in multiply dominated scenarios. A multiply dominated scenario may occur when the exponents of the inputs (A, B, C) are such that the product (A*B) exponent is greater than the addend (C) exponent.

A second source of error may come from further hardware optimizations of the FMA, where a completion adder width and an LZA width are limited to the lower bits of the intermediate result, roughly the width of the product mantissa (which may be twice the width of input operands), and the upper bits use an incrementer.

In one exemplary implementation, the completion adder and LZA width is equal to the product mantissa plus two bits. This exemplary error may be introduced in an addend dominated scenario. An addend dominated scenario may occur when the exponents of the inputs (A, B, C) are such that the addend (C) exponent is greater than the product (A*B) exponent. The exemplary error may occur when a carry-out operation from the completion adder causes the upper bits of the sum's mantissa to be incremented such that the higher bits of the addend propagate the carry-out into the most significant set bit (e.g., a non-incremented string of addend upper mantissa bits is monotonically increasing from left to right: i.e., zero or more 0s followed by zero or more 1s). In this exemplary case, one approach would cause the normalizer unit to overshift by 1, requiring the normalizer to be 1 bit wider as well as requiring an additional right shift to correct the sum's mantissa before it is sent to the rounder. Also, in addend dominated scenarios, a borrow operation during effective-subtraction from the most significant bit may cause the shift amount from the exponent difference to be too small by 1. This exemplary case may be corrected by performing an additional 1-bit left shift.

Floating-point numbers that have a sign bit can be positive or negative. This affects the effective operation that is being performed. For example an addition operation on two positive numbers or two negative numbers is referred to as effective-addition, in which case the magnitude of the result is larger than the magnitude of the inputs. On the other hand, an addition operation on a positive and a negative number is referred to as effective-subtraction. Correspondingly, a subtraction operation on two positive numbers or two negative numbers is referred to as effective-subtraction and a subtraction operation on opposite signed numbers is referred to as effective-addition.

These exemplary sources of error cannot occur simultaneously, since addend dominated scenarios and multiply dominated scenarios are mutually exclusive. Furthermore, effective-addition and effective-subtraction are mutually exclusive. In one exemplary embodiment, these errors may be corrected by using a right shift and a left shift. This would cost extra latency, area, and power on the chip.

SUMMARY OF THE INVENTION

Embodiments of this present invention provide an exemplary floating-point unit with a fused multiply add (FMA) hardware design that performs a fused multiplication and addition operation on floating-point numbers with improved normalization, requiring less logic and less delay than in conventional embodiments. Exemplary embodiments provide an FMA with improved latency, power and area. In one exemplary embodiment, an FMA performs multiply and addition operations on floating-point numbers, where shift amount errors are corrected with a single shift. This exemplary method requires a single shift as the mantissa and exponent are pre-adjusted or biased such that regardless of the cause of the error (e.g., error from LZA, error with effective-addition, and error with effective-subtraction), existing rounder logic may be used to adjust the exponent and mantissa to correct for the error with a single shift.

In a method according to one embodiment of the present invention, a method for correcting a shift error in a fused multiply add operation is disclosed. The method comprises adjusting the normalization shift amount of an FMA intermediate result, based on early-arriving information about the FMA scenario to produce an adjusted normalized floating-point number, and correcting the adjusted normalized floating-point number in a data-dependent, low-latency, predictable manner. The FMA intermediate result is an FMA result after multiplication and addition, but before normalization and rounding. The correcting of the shift error comprises shifting a mantissa of the adjusted normalized floating-point number in one direction and correspondingly modifying the normalized exponent.

In a fused multiply add module according to one embodiment of the present invention, a fused multiply add module comprises a normalizer module, compensation logic, and a rounder. The normalizer module is operable to normalize a floating-point number to produce a normalized floating-point number. The floating-point number is normalized based upon an estimated quantity of leading zeros. The compensation logic is operable to manage a correction of a shift error in the normalized floating-point number. The rounder is operable to correct the shift error with a mantissa shift in one direction.

BRIEF DESCRIPTION OF THE DRAWINGS

Embodiments of the present invention will be better understood from the following detailed description, taken in conjunction with the accompanying drawing figures in which like reference characters designate like elements and in which:

FIG. 3A illustrates an exemplary table illustrating a plurality of process flows for a plurality of exemplary datapaths in accordance with an embodiment of the present invention;

FIGS. 4A, 4B, and 4C illustrate diagrams of a plurality of steps in a process for correcting shift errors in a fused multiply add operation in accordance with an embodiment of the present invention.

FIGS. 5A, 5B, and 5C illustrate diagrams of a plurality of steps in a process for correcting shift errors in a fused multiply add operation in accordance with an embodiment of the present invention.

FIGS. 6A, 6B, 6C, and 6D illustrate diagrams of a plurality of steps in a process for correcting shift errors in a fused multiply add operation in accordance with an embodiment of the present invention.

DETAILED DESCRIPTION

Figure 1A:
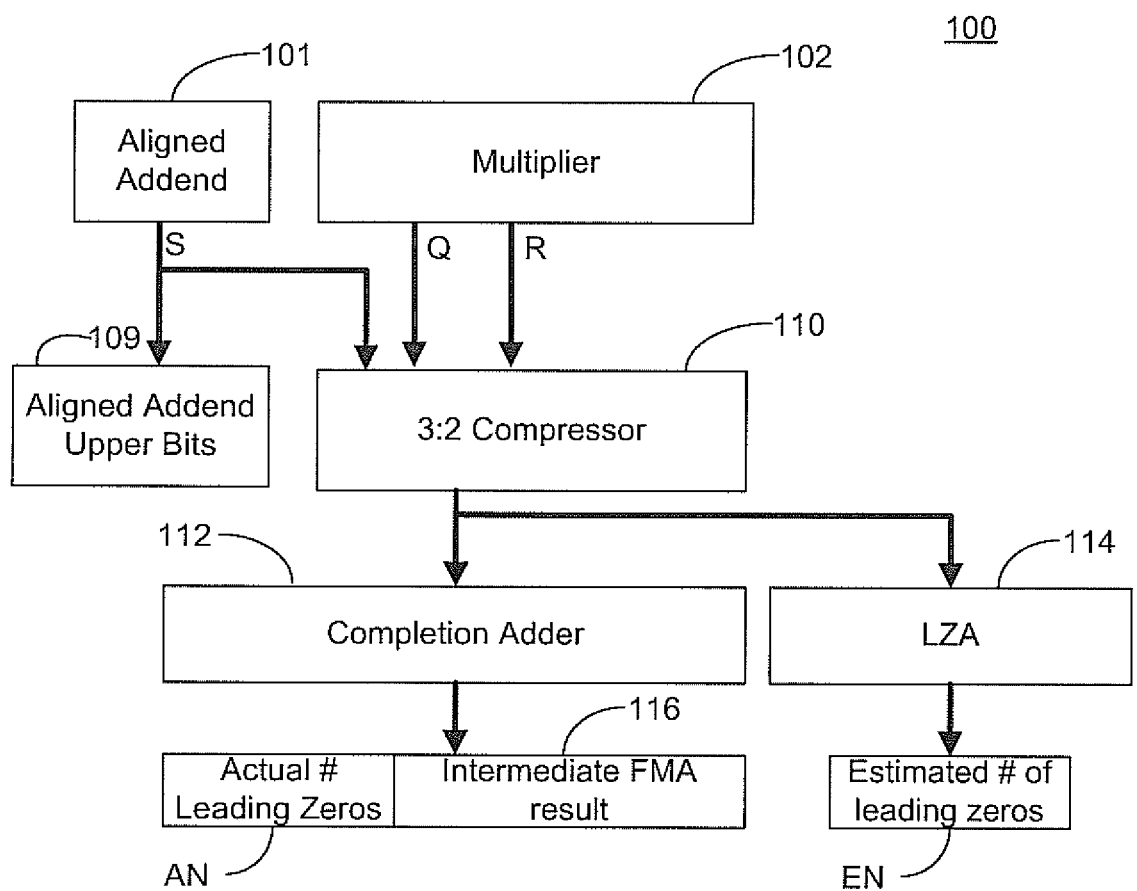
FIG. 1A illustrates a simplified block diagram of a portion of a fused multiply add unit in accordance with an embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing figures. Similarly, although the views in the drawings for the ease of description generally show similar orientations, this depiction in the figures is arbitrary for the most part. Generally, the invention can be operated in any orientation.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Embodiments of this present invention provide solutions to the increasing challenges inherent in correcting normalization shift errors in fused multiply add operations. Embodiments of this present invention provide an exemplary floating-point unit with a fused multiply add (FMA) hardware design that performs a combination multiply and addition operation on floating-point numbers with improved normalization, requiring less logic and less delay than in conventional embodiments. Exemplary embodiments provide an FMA with improved latency, power and area. In one exemplary embodiment, an exemplary floating-point unit performs fused multiply add operations on single and double precision binary floating-point numbers. In one exemplary embodiment, an exemplary floating-point unit performs fused multiply add operations on single precision binary floating-point numbers.

As discussed in detail below, the FMA may perform the above described combined multiplication and addition operation on floating-point numbers while correcting normalization shift errors with a shift in only one direction, as performed by a rounder with existing circuitry. In contrast, conventional embodiments require both a right shift and a left shift to correct any of the possible types of normalization shift errors. In one exemplary embodiment, the rounder-performed shift is a right shift. In one exemplary embodiment, the rounder performed shift is a 1-bit shift. As discussed in detail below, these embodiments require a rounder to perform a shift in only one direction because the resulting mantissa and exponent from the normalization operation are pre-adjusted or biased. Therefore, regardless of the cause of the error (e.g., error from the LZA, error with effective-addition, and error with effective-subtraction), existing rounder logic may be used to adjust the resulting pre-adjusted, normalized exponent and mantissa to allow for the correction of the error with a mantissa shift in only one direction.

FIG. 1A illustrates an overview of the portion of mantissa datapath of an exemplary fused multiply add (FMA) module that produces the intermediate result and leading zero estimation 100. FIG. 1A illustrates an FMA mantissa datapath, illustrating how an intermediate result (the result before normalization) may be generated. FIG. 1A also illustrates how leading zeros are estimated with an LZA. This diagram abstracts away certain details such as whether the upper bits of the intermediate result are generated with a completion adder or with an incrementer. The exemplary FMA module 100 of FIG. 1A comprises a an aligned addend 101, a multiplier 102, an aligned addend upper bits block 109, a 3:2 compressor 110, a completion adder 112, and a leading zero anticipator (LZA) 114. In one exemplary embodiment, an aligned addend comes from an aligner that shifts the addend, based on the exponents and produces an aligned addend which corresponds to the vector "S." As discussed herein, an exemplary multiplier 102 may produce two vectors (e.g., product_S 106 and product_C 108) that when summed together provide the product that is summed with the aligned addend 104. Product_S and Product_C correspond to Q and R, leading from the multiplier to the 3:2 compressor. FIG. 1A differs from FIG. 2 in that it focuses on the generation of the intermediate result, rather than showing the entire FMA datapath.

Figure 1B:
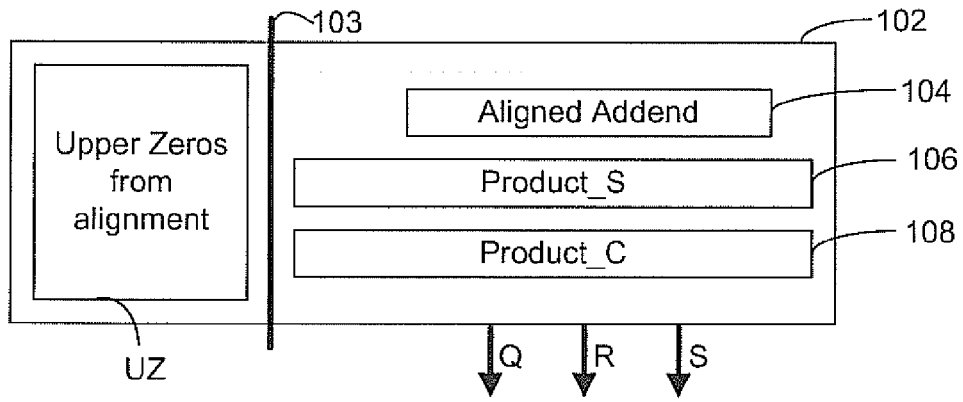
FIGS. 1B, 1C, and 1D illustrate exemplary simplified block diagrams for alignments of a plurality of exemplary mantissas.
Figure 1C:
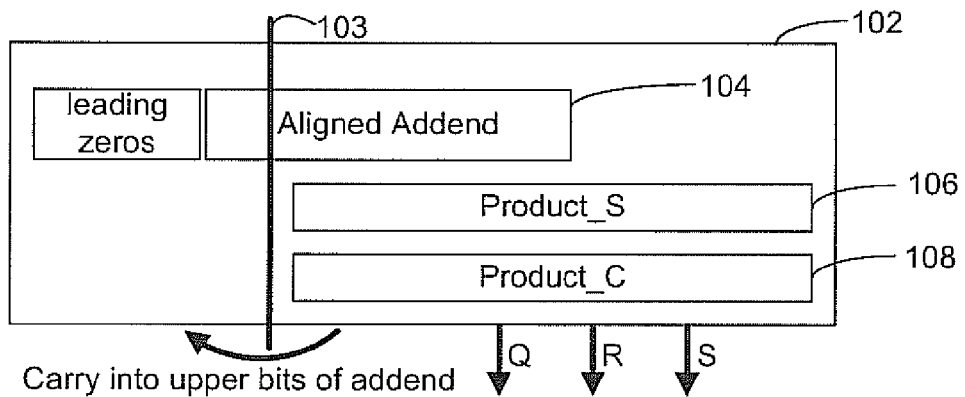
Figure 1D:
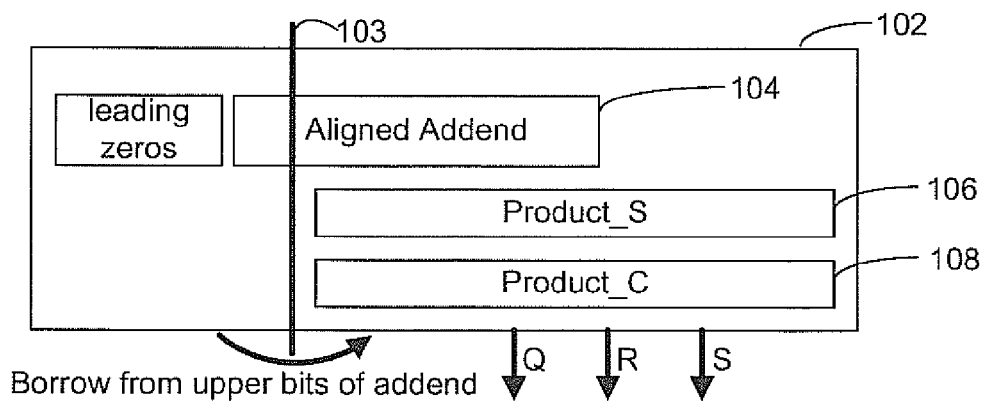

As illustrated in FIGS. 1B, 1C, and 1D, the mantissas of the addend 104, the product_S 106, and the product_C 108 may be divided into an upper portion and a lower portion, the portions divided by a vertical line 103. FIGS. 1B, 1C, and 1D illustrate that only the lower portion of the product mantissa will be passed on to the 3:2 compressor.

As illustrated in FIG. 1A, while a estimated number of leading zeros EN may be rapidly calculated by the LZA 114; in a slower process, an intermediate FMA result 116 of the completion adder 112 will determine an actual quantity of leading zeros AN from the resulting mantissa of the intermediate FMA result 116. As further illustrated in FIG. 1A, in one exemplary embodiment, the estimated quantity of leading zeros EN may be greater or equal to the actual quantity of leading zeros AN, but less than or equal to the actual quantity of leading zeros plus 1 (AN+1), resulting in a relationship of AN≤EN≤AN+1. In other embodiments, the LZA may produce an estimated number of leading zeros, EN with the relationship AN−1<EN<AN. In aligning the addend input, a quantity of upper zeroes UZ may precede the msb of the aligned addend 104; therefore, an ideal normalization amount may equal UZ+AN, while the actual normalization amount may equal UZ+EN. In other words, the actual normalization amount could be off by ±1 due to the LZA, depending on the type of LZA used. A "normalization error" may be produced from other sources, as will be detailed in subsequent paragraphs.

As illustrated in FIG. 1A, an exemplary source of normalization error comes from the LZA 114. In one exemplary embodiment, the LZA performs a fast estimation of a quantity of leading zeros in parallel with the completion adder 112 to determine the normalization amount. A normalization shift amount as determined by the LZA 114 may be off by 1 from a true quantity of leading zeros. This error may be introduced in multiply dominated scenarios. In one embodiment, the LZA may have an error of −1. In another embodiment; the LZA may have an error of +1. As illustrated in FIG. 1B, a multiply dominated scenario may occur when the exponents of the inputs (Q, R, S) are such that the product (Q*R) exponent is greater than the addend (S) exponent. The addend 104 will overlap with the vectors 106, 108 from the multiplier 102, so that the addend 104 will be shifted to the right, and away from the vertical line 103 that defines where the upper bits begin, as illustrated in FIG. 1B.

FIGS. 1C and 1D illustrate a second source of error that may come from hardware optimizations of the FMA 100, where a completion adder 112 width and an LZA 114 width are limited to the lower bits of the product mantissa, and the upper bits use an incrementor. This exemplary error may be introduced in an addend dominated scenario. An addend dominated scenario may occur when the exponents of the inputs (Q, R, and S) are such that the addend (S) exponent is greater than the product (Q*R) exponent, as illustrated in FIGS. 1C and 1D.

As illustrated in FIG. 1C, the exemplary error may occur when a carryout operation from the completion adder 112 causes the upper bits of the sum's mantissa 116 to be incremented such that the higher bits of the addend propagate the carry-out into the most significant set bit (e.g., the non-incremented string of upper addend mantissa bits is monotonically increasing from left to right: zero or more 0s followed by zero or more 1s). As illustrated in FIG. 1C, the carry-out will move into the upper bits of the addend 104. The upper bits are defined by the vertical line 103. If the upper bits (e.g., those bits to the left of the vertical line 103) of the addend 104 are zero or more 0s followed by zero or more 1s, a carry-out operation will propagate into the most significant set bit (msb) and cause the normalized amount to be too large by 1 bit. Because the normalized amount is determined by the number of leading zeros on the preincremented value, the normalizer module will over-shift by 1 bit. A straightforward approach to correct this over-shift would be to build the normalizer module to be 1 bit wider, as well as include an additional right shifter to correct the final mantissa before it is sent to the rounder.

As illustrated in FIG. 1D, in addend dominated scenarios, a borrow operation during subtraction from the most significant set bit may cause the shift amount from the exponent difference to be too small by 1 bit. FIG. 1D illustrates an exemplary error caused by effective-subtraction. For example, if the upper bits (e.g., mantissa bits to the left of the vertical line 103) of the addend 104 in FIG. 1D, are zero or more "0"s followed by a "1" followed by zero or more "0"s, then a borrow operation will ripple from the most significant set bit and cause the normalization amount to be too small by 1 bit. A common way to correct the normalization amount may be to perform an additional 1-bit left shift.

Figure 2:
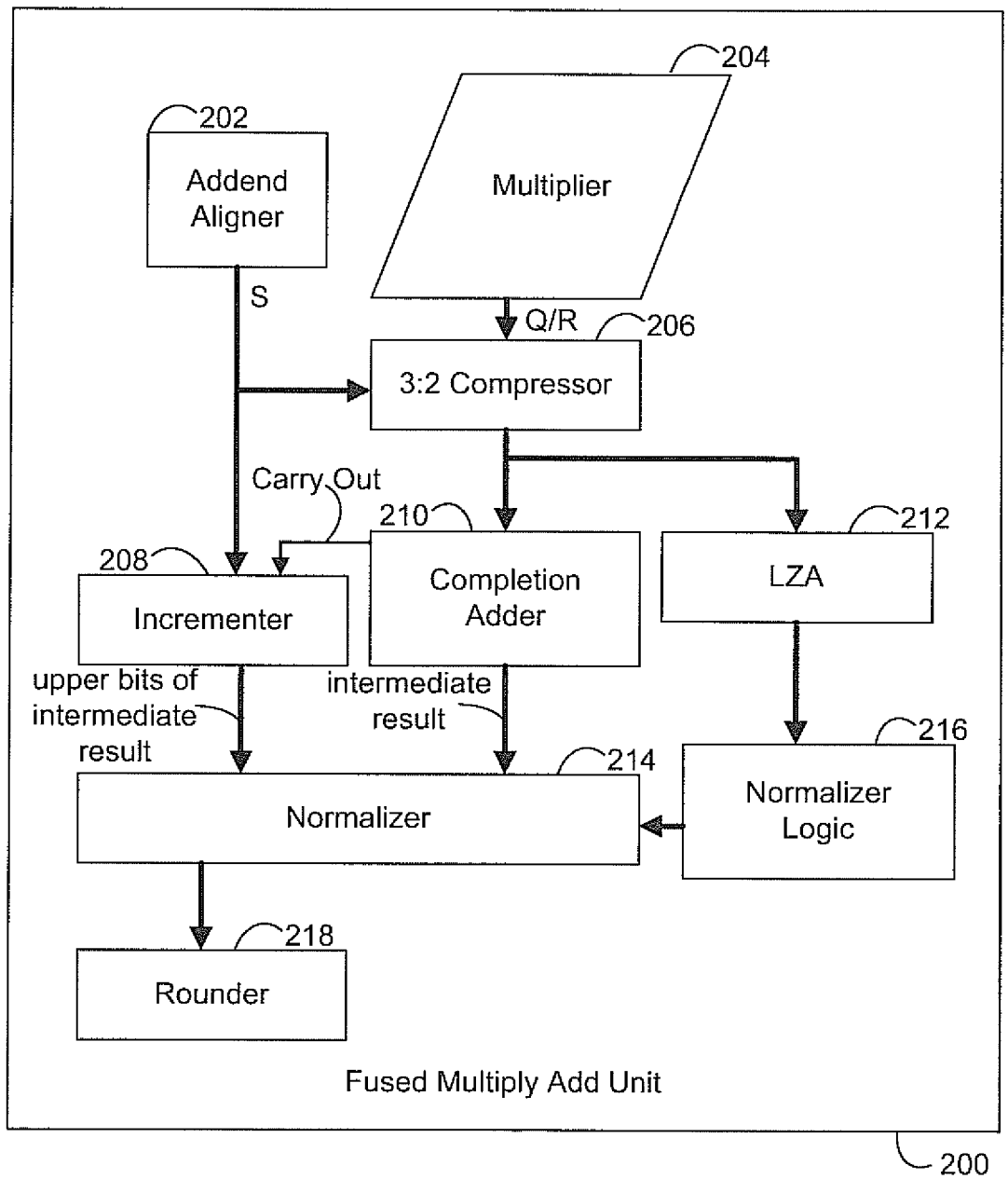
FIG. 2 illustrates a simplified block diagram of a fused multiply add unit in accordance with an embodiment of the present invention.

FIG. 2 illustrates an exemplary high-level circuit block diagram of a fused multiply add hardware embodiment. As illustrated in FIG. 2, an exemplary FMA 200 comprises an addend aligner 202, a multiplier 204, a 3:2 compressor 206, an incrementer 208, a completion adder 210, a leading zero anticipator (LZA) 212, a normalizer 214, normalizer logic 216, and a rounder 218. The addend aligner 202 aligns the addend 104 such that it may be added to the product of the multiplication of the other two inputs (A*B). As discussed herein, the multiplier 204 produces two vectors Q, R (product_S 106 and product_C 108, as illustrated in FIG. 1B) that when summed together with the addend 104 in the 3:2 compressor 206 and the completion adder 210, and concatenated with the incrementer (208) result as the upper bits, an intermediate FMA result is created, and then input to the normalizer 214.

In one exemplary embodiment, an inefficient design may comprise a completion adder and LZA that are 3N+2 (where N is a width of the input mantissas) bits wide to produce an intermediate result. However, in another exemplary embodiment, a more efficient design may comprise a completion adder and LZA that are of width 2N+2 bits wide, with an incrementor on the upper N bits to produce the intermediate result. In one single-precision embodiment, N=24, while in one double-precision embodiment, N=53. However, N may be any number.

As discussed herein, when adding two binary floating-point numbers, their exponents dictate how their mantissas are to be aligned by the addend aligner 202. For example, during addition, if both binary floating-point numbers' exponents are the same, no alignment is necessary and the mantissas may be added together without any alignment being performed on them. However, if the exponents are different, the mantissas need to be aligned before they can be added or subtracted. As discussed herein, once an exponent of an augend has been incremented or decremented to match the exponent of an addend, the mantissa of the augend will be shifted by an equivalent number (e.g., incrementing the exponent by four is accompanied with a mantissa right shift by four positions, while decrementing the exponent by four is accompanied with a mantissa left shift by four positions).

As illustrated in FIG. 2, the addend aligner 202 may take the addend 104, which is C from (A*B±C), and shift the mantissa of addend 104, depending on the product of (A*B). The addend aligner 202 will shift the addend (C) mantissa based on the difference between the addend exponent and the product (A*B) exponent. In this way, the mantissa of the addend will be aligned to the mantissa of the product.

The leading zero anticipator (LZA) 212 of FIG. 2, as discussed herein, may be used to determine an estimated number (EN) of leading zeroes that a value produced by the completion adder 210 would have. While logic operating on the intermediate FMA result from the completion adder 210 may compute an actual number (AN) of leading zeroes versus an estimated number of leading zeroes from the LZA 212, the EN from the LZA is more rapidly computed. This LZA estimate may be fed into the normalizer logic 216 so that the normalizer logic 216 may determine the amount by which the mantissa of the intermediate result must be left-shifted by the normalizer 214 such that the most significant set bit position moves to the msb. By using an LZA, an estimated quantity of leading zeros (EN) may be rapidly determined, rather than waiting for the completion adder 210 to finish processing. As discussed herein, determining a quantity of leading zeroes will also determine the location of the current most significant set bit position and the extent of the left-shifts required to move the most significant set bit position to the msb.

An exemplary rounder 218, as illustrated in FIG. 2, may be used to round the output from the normalizer and to provide a final mantissa shift to correct for any normalization errors. As discussed herein, normalization errors can be caused by incorrect estimations from the LZA 212, or caused by carry-out or borrow operations that affect a most significant set bit of the intermediate result. Subsequently, after the left shifting performed by the normalizer 214, the position of the most significant set bit of the subsequent mantissa may be such that the intermediate result is not normalized (i.e., the msb is set). As also discussed herein, a datapath that a mantissa may follow (e.g., through normalization and rounding) may be pre-biased or pre-adjusted so that regardless of the source of the error (e.g., LZA, Qualified Add Dominated errors with effective addition (QADEA) and Qualified Add Dominated errors with effective subtraction (QADES)), a potential shift error would be a −1 shift. In one exemplary embodiment, when a source of the normalization error is from QADEA or QADES, the mantissa may be pre-biased before any rounding or error correction, such that all errors are properly corrected with a similar mechanism. Rather than detecting and correcting three different types of normalization errors, any error may be detected and corrected with a single correction operation.

In one embodiment, there is a single method used to detect normalization errors and a single method used to correct normalization errors. In one exemplary embodiment, pre-biasing mantissas and exponents of binary floating-point values output from the normalizer 214 allow any normalization errors to be corrected by the rounder 218 with a mantissa shift in a single direction. As discussed herein, in conventional embodiments, normalization errors must be corrected with both a right shift and a left shift.

Exemplary embodiments handle all types of errors. The pre-adjusting described herein allows the exemplary rounder 218 to perform all post-shift operations in only one direction. As discussed herein, with right shift or exponent decrement operations performed during exemplary pre-biasing steps, as illustrated in column 305 of FIG. 3A, and discussed below, the normalization errors may be corrected with either right shifts or exponent increments. In one embodiment, the right shifts and exponent increments performed in the rounder, provide datapath modifications, as illustrated in column 306 of FIG. 3A, that provide the net effects to the datapaths, as illustrated in column 307 of FIG. 3A.

Exemplary Process for Correcting Normalization Error:

FIG. 3A illustrates an exemplary table of logic for correcting normalization errors in fused multiply add units 200. As described in detail below, each case has one or more data path scenarios. A first column 301 of FIG. 3A comprises a plurality of datapath cases: !QAD, QAD, ASZ (denormal), ASZ (normal), and QAD denormal. As described in detail below, "!QAD" (not addend dominated) indicates a scenario (rows 1-2) where the mantissa of the addend 104 is not aligned above the product due to the input exponents. QAD (qualified addend dominated) indicates a scenario (rows 3-6) where the addend mantissa 104 is aligned above the product mantissa due to the input exponents. In the QAD scenarios (rows 3-6), the mantissa bits may interact in such a way that a carry into (row 4) or a borrow from (row 6) the addend mantissa may occur. As discussed herein, qualified means there is a candidate pattern for carry out that may cause an error between actual leading zeroes and determined leading zeroes (from before the carry out was calculated). ASZ (align shift zero) indicates a scenario (rows 7-9) where the addend aligner 202 does not need to shift the addend mantissa 104 since its exponent is so large that the product mantissa bits will not interact with them during the mantissa addition or subtraction. Finally, "QAD denormal" indicates a scenario (rows 10-14) equivalent to the QAD scenario, but where the addend mantissa 104 is denormal (i.e., the number is not normalized: the most significant digit is "0"). As discussed herein, the above datapath types for an exemplary FMA 200 represent exemplary scenarios (rows 1-14) that must be individually managed to correct any normalization errors.

A second column 302 of FIG. 3A indicates whether an error for a given scenario is a Qualified Add Dominated error with effective addition (QADEA) or a Qualified Add Dominated error with effective subtraction (QADES), as discussed above. Entries of "X" in the second column 302 (rows 1-2, 7-9, and 14) indicate don't care, in other words, the scenario is valid regardless if the operation is QADEA or QADES.

A third column 303 of FIG. 3A indicates a source of a normalization amount for a given scenario. In one exemplary embodiment, there are three options: the LZA, an addend align shift, or an addend align shift plus the number of leading zeroes in the addend. The error may be introduced by the LZA or the addend aligner, as described herein.

A fourth column 304 of FIG. 3A indicates a normalization restriction. A value of "1" indicates that the mantissa is unconditionally normalized. A value of "0" indicates that the mantissa normalization is exponent restricted (e.g., the mantissa remains denormal if the exponent is less than or equal to zero). Entries of "X" indicate don't care because they won't get a denormal result. In one exemplary embodiment, this normalization restriction may be mapped to a mode bit for certain architectures. For example, in exemplary x86 architectures it corresponds to masked vs. unmasked underflow exceptions. If the mantissa result is denormal, there may be two ways of handling it: the mantissa may be normalized before precision exceptions are detected, or the mantissa may not be normalized before precision exceptions are detected.

A fifth column 305 of FIG. 3A indicates exemplary possible normalization shift errors for a given scenario. The fifth column 305 may illustrate an amount by which the source of normalization in the FMA 200 is off from a correct shift amount. For example, as illustrated in the fifth column 305, a normalization shift error may be "0" (no shift error), "−1" or "1."

A sixth column 306 of FIG. 3A indicates how an exemplary datapath may be modified (that is biased) before any rounding or shifting by the rounder 218 compensates for any normalization errors. The sixth column 306 of FIG. 3A illustrates exemplary pre-round modifications to the datapath before the mantissa is input into the rounder 218. Two possible mantissa operations (mant<<1, none) may be performed in the pre-round modification step: (none, exp−−) which indicates the mantissa is not modified and the exponent is decremented by one, and (mant>>1, none) which indicates that the mantissa is right shifted by 1, and the exponent is not modified. As illustrated in the sixth column 306 of FIG. 3A, before the mantissa is passed to the rounder 218, the datapath may be pre-adjusted with either no mantissa shift combined with an exponent decrement (none, −−) or a right mantissa shift combined with no increment change (>>1, none). As discussed below, these pre-adjustments are combined with the rounder & normalization behaviors of the seventh column 307 of FIG. 3A to produce the desired net impacts illustrated in the eighth column 308 of FIG. 3A.

Figure 3B:
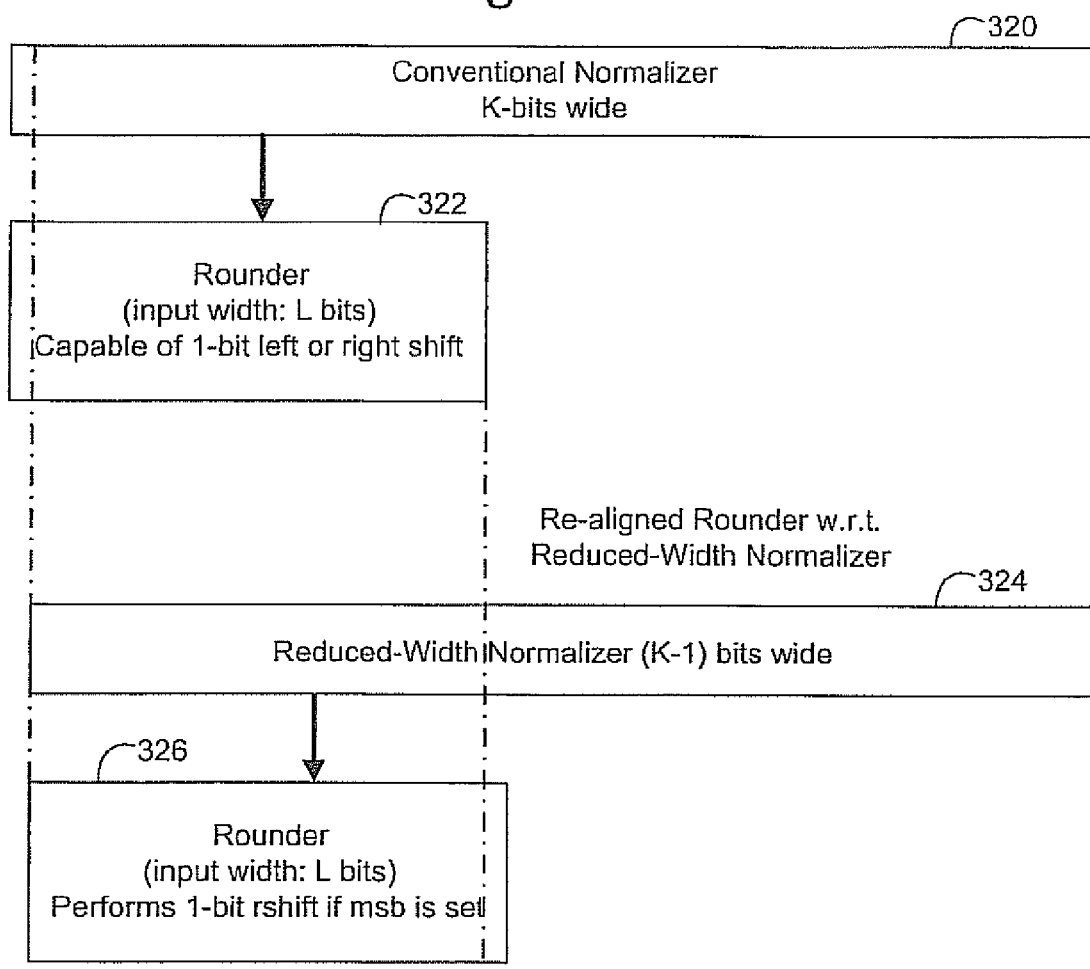
FIG. 3B illustrates rounder alignments with respect to a normalizer using an exemplary simplified rounder and an exemplary narrow width normalizer in accordance with an embodiment of the present invention.

The seventh column 307 of FIG. 3A illustrates exemplary rounder 218 and normalizer 214 modifications to exemplary datapaths (e.g., whether there has been an exponent increment with no mantissa modifications (none, exp++), or a left shift of the mantissa with no exponent modifications (mant<<1, none)). As discussed herein, a shift of "none" in the seventh column 307 of FIG. 3A may be achieved by right shifting the mantissa one bit position inside the rounder 218. In one exemplary implementation, a mantissa shift (mant<<1) can be achieved by moving the rounder alignment to the right 1 bit position, relative to a conventional normalizer, without shifting the mantissa at all. Thus, a left shift (mant<<1) may be achieved when the rounder 218 does not internally shift the mantissa. This transformation is illustrated in FIG. 3B, and is described in more detail below. Accordingly, in this exemplary implementation, the rounder may require a right shift to achieve the effect of none on the mantissa. An msb of the rounder 218 may be aligned to an msb of a "full" conventional normalizer (an exemplary full conventional normalizer has an extra bit at the top and without exemplary pre-normalization adjustments that ensure that this bit will always be 0).

Combined with the pre-bias adjustments from the sixth column 306, mantissa left shifts or exponent increments from the seventh column 307 produce the datapath results illustrated in the eighth column 308 of FIG. 3A. As discussed herein, an exemplary rounder 218 may internally right shift to produce no shift in the mantissa ("none") from the sixth column 306. Meanwhile, no internal shifts in the rounder 218 will produce a left shift in the mantissa ("mant<<1") from the sixth column 306. Therefore, only a right shift in the rounder (or no shift at all) is required to correct for any of the normalization errors illustrated in FIG. 3A. Note that the processes enumerated in FIG. 3A may be used even if the optimization of aligning the rounder one position to the right of the normalizer (as illustrated in FIG. 7) is not used.

The eighth column 308 of FIG. 3A illustrates exemplary net impacts on the datapath, such that FMA normalization errors are corrected. As illustrated in FIG. 3A, the sixth column 306 and the seventh column 307 are combined to produce the net impact illustrated in the eighth column 308. In row 1 of the eighth column 308, because there was no normalization error introduced by the LZA 212, there will be no impact on the datapath ("none," "none"). In row 2 of the eighth column 308, because there was a normalization shift error introduced by the LZA, the mantissa will be left shifted by 1 and the exponent decremented by 1 ("mant<<1," "exp--"). As discussed herein, the pre-biasing of the sixth column 306 allows the rounder 218 to correct for normalization errors with only a single mantissa shift, or no shift. The single mantissa right shift in the rounder 218 (e.g., a right shift) corresponds to the no mantissa shift (none) of the seventh column 307, while no mantissa shift in the rounder 218 corresponds to the left mantissa shift (mant<<1) of the seventh column 307 due to the placement of the rounder 218 previously discussed.

FIG. 3A illustrates 14 exemplary datapath cases. In rows 1-2, "!QAD" (not add dominated) scenarios are illustrated. The !QAD scenarios are exemplary cases where the addend mantissa of the FMA operation is aligned such that it doesn't dominate the product mantissa (e.g., wherein the addend mantissa 104 is aligned above the product mantissa (product_S 106 and product_C 108)), due to exponent alignments, as illustrated in FIG. 1B).

As illustrated in FIG. 3A, the first scenario, row 1, is where an exemplary estimated quantity of leading zeroes from an LZA 212 is correct and the corresponding normalization shift error in column five 310 is 0. In the second scenario, row 2, an exemplary estimated quantity of leading zeroes from an LZA 212 is −1 (i.e., the LZA estimate, EN, is one less than the actual number of leading zeros, AN). As discussed herein, an LZA error is not detectable until the completion adder 210 has produced its output with the actual quantity of leading zeroes. Furthermore, with this method, it is not required to determine the actual quantity of leading zeros. Because this normalization error cannot be detected until the last stage of the process, a normalization error caused by an LZA 212 may be corrected in a rounder 218, which in this exemplary embodiment may have the capability to shift the mantissa by 1 and increment the exponent.

Continuing with the datapath scenarios in rows 1-2, the rounder and normalization behavior for rows 1-2 is illustrated in the seventh column 307. The seventh column 307 of FIG. 3A illustrates exemplary aggregate behavior of the normalizer 214 and the rounder 218. For row 1, the seventh column 307 comprises no mantissa shift combined with an exponent increment ("none," exp++). The rounder and normalization behavior of row 1 is achieved with an exponent increment and a right shift in the rounder 218. For row 2, the seventh column 307 comprises a mantissa left shift and no exponent change ("mant<<1," none). The rounder and normalization behavior of row 2 is achieved with no exponent change and no shift in the rounder 218. In one exemplary implementation, the rounders ability to detect the position of the msb and perform a right shift obviates the need to differentiate between rows 1 and 2. Thus, the datapath produces the correct result even if there is no intermediate circuitry such as a leading zeros counter on the intermediate result to detect the Norm Shift Error 305.

In rows 3-6, exemplary qualified add-dominated scenarios are illustrated. An add-dominated scenario may be defined as where the msb of the aligned addend is above the highest bit of a product. While a qualified add dominated scenario may be defined as having the most significant set bit of the addend be above the width of the completion adder and LZA (in one embodiment, the completion adder and LZA may be two bits wider than the product). In rows 3-4, qualified add dominated scenarios with effective-addition are illustrated. The datapath is "qualified" add dominated when the addend is aligned above the product, and it is known that normalization amount will not come from the LZA. In one exemplary implementation, qualified add dominated occurs when the mantissa of the addend 104 is more than two bit positions to the left of the most significant product bit. In one exemplary implementation, qualified add dominated also corresponds to the msb of the addend being aligned above the width of the completion adder and LZA. Furthermore, in this scenario we know that the msb after the summation is no more than one bit away from the msb before the summation. An exemplary add dominated datapath that is an effective-addition operation is also illustrated in FIG. 1C. In one exemplary implementation, the rounders ability to detect the position of the msb and perform a right shift obviates the need to differentiate between rows 3 and 4. Thus, the datapath produces the correct result even if there is no intermediate circuitry such as a leading zeros counter on the intermediate result to detect the Norm Shift Error 305. In rows 5-6, qualified add dominated scenarios with effective-subtraction are illustrated. Similarly to the datapaths for rows 3-4, an exemplary binary value of 000100−1=000011. Therefore, in this example, the most significant set bit has decremented from bit position 3 to bit position 2. FIG. 1D illustrates such an exemplary add dominated case with effective-subtraction, where a borrow from the upper bits of the addend mantissa may result in a shifting of the most significant set bit. Therefore, depending on the sign of the addend 104 (whether effective-addition or subtraction is taking place), the most significant set bit could be in one of three positions, depending on whether the bit position will be staying the same, shifting to the left because of a carryout operation, or shifting to the right because of a borrow operation. In one exemplary implementation, the rounders ability to detect the position of the msb and perform a right shift obviates the need to differentiate between rows 5 and 6. Thus, the datapath produces the correct result even if there is no intermediate circuitry such as a leading zeros counter on the intermediate result to detect the Norm Shift Error 305.

FIG. 3B illustrates one exemplary implementation of a rounder and its alignment with the normalizer. FIG. 3B illustrates a conventional approach which includes a full-width (represented as K-bits) conventional normalizer 320 and a rounder 322 than can perform a left shift or a right shift. The conventional normalizer 320 and rounder 322 are compared to a reduced-width normalizer 324 and an exemplary rounder 326 which performs a 1 bit right shift if the MSB is set. Note that the rounder 326 alignment with respect to the reduced-width normalizer 324 is transposed 1 bit right as compared to the alignment of the rounder 322 to the normalizer 320. This allows the column 307 transformation of mantissa operations of none to right shift and mant<<1 to no shift as described in earlier paragraphs and shown in FIG. 3A. Also note that the reduced-width normalizer can be narrower due to the guarantee from pre-shifting (as enumerated in FIG. 3A), that the bit above its msb will never be set.

As illustrated in FIG. 3B, the conventional normalizer 320 is K-bits wide, where K is sufficiently large to allow for normalizer overshift errors of +1, which would occur in embodiments without pre-adjustments to the shift amount. The rounder 322 input bit width of L-bits is sufficient width to perform rounding and proper shifting and produce a correct final result. In one exemplary implementation, L is the format width plus sufficient rounding bits, plus an extra bit to allow for a right shift. Note that L is the same for both the round 322 and the rounder 326 in FIG. 3B.

The rounder 322 requires more logic than the rounder 326 because the rounder 322 must be capable of doing a left shift or a right shift. In contrast, the rounder 326 performs a 1-bit rightshift if its input msb is set.

As illustrated in FIG. 1C, there is a vertical line 103 to the left of the product_S mantissa 106 and the product_C mantissa 108. To the right of the vertical line 103 the aligned addend 104, product_S 106, and product_C 108 are summed with the 3:2 compressor 206 and the completion adder 210. In one exemplary embodiment, a carry operation (as a result of the summing of the above mantissas) will cross the vertical line 103. In one embodiment, a full addition isn't performed on the full width of the product, as there will be no addition performed. The upper bits of the product mantissa will either remain unchanged or incremented by 1 in the addition case, or decremented by 1 in the incrementor 208, as illustrated in FIG. 2. As discussed herein, normalization takes into consideration the most significant set bit. Therefore, if the addend mantissa 104 to the left of the vertical line 103 was zero or more 0s followed by zero or more 1s, a carry out operation would cause the most significant set bit to shift one bit to the left. For example, in an exemplary binary value of 000111, if 1 was added, the result would be 001000, which would change the most significant set bit position from the third bit to the fourth bit position. Therefore, at the time of the addition, the position of the most significant set bit may be unknown (for example, it may be bit position 3 or 4).

FIG. 3A also illustrates how the QAD datapath scenarios in rows 3-6 may be biased in pre-round modifications to resemble the above described LZA normalization error scenarios. For example, for rows 3-4, in the sixth column 306, pre-round modifications comprise shifting the mantissa to the right by 1, while making no change to the exponent ("mant>>1," "none"). Then the mantissa shifting or exponent incrementing adjustments will (as illustrated in rows 3-6 of the seventh column 314), combined with the pre-adjusting or bias (as illustrated in rows 3-6 of the sixth column 312) produce the net results seen in the eighth column 316, and so correct for the normalization error (e.g., no error for row 3 and a normalization error of −1 for row 4).

As illustrated in row 4 of FIG. 3A, a conceptual right shift may be performed during the pre-round modification to datapath step. While in the exemplary embodiments in which a rounder is aligned 1 bit position right of the normalizer, a rightshift by the rounder corresponds to a rounder normalization behavior modification to the mantissa of none, an additional right shift in the pre-round modification to the datapath will need to be performed in certain cases. In other words, there may be a mantissa right shift, followed by a physical right shift performed by the rounder 218, but due to the alignment of the exemplary rounder, this results in a net mantissa impact on the datapath of mant>>1. Such conceptual operations may be performed such that they do not increase design latencies.

The datapath scenarios illustrated in FIG. 3A may break down what an exemplary rounder 218 is doing from a system point of view. For example, when there is no normalization error, the net result will be to have no impact on the datapath mantissa position and exponent. However, if the normalization shift error is −1, then the mantissa must be shifted 1 bit to the left and the exponent decremented, while if the normalization error was 1, then the mantissa must be shifted 1 bit to the right and the exponent incremented. FIGS. 4-6, as discussed below, provide scenario examples for fused multiply add operations, as well as for correcting their different forms of normalization errors. The above-described operations may be accomplished with minimal hardware in the rounder (that is, a right-shift by 1-bit capability).

In rows 7-9 of FIG. 3A, ASZ (denormal and normal) datapath scenarios are illustrated. The scenarios are each similar. In align shift zero (ASZ) scenarios, an aligned addend 104 does not interact with the multiply portion. Therefore, as illustrated in rows 7-9 of FIG. 3A, align shift zero scenarios will not see any normalization shift errors, and therefore, pre-biasing modification of exponent decrements may be offset by rounder and normalization behavior modifications that increment the exponents to produce a zero net impact as there was no normalization error.

In rows 10-14 of FIG. 3A, QAD (denormal) datapath scenarios are illustrated. The qualified add dominated datapath cases are effective-addition and subtraction cases where the addend is denormal. As illustrated in the third column 306, for rows 10-13, the source of the normalization is an addend align shift plus leading zeros. Rows 10-14 are datapath scenarios where the addend is denormal, but where the addend denormal is larger than the multiplication result denormal. Therefore there will be no contribution from the multiplier (e.g., the addend mantissa will be two or more bits away from the multiplier result mantissa). Note, that when the normalization restriction, as illustrated in rows 10-14 of the fourth column 308 is 0, then the normalization error correction method will be the same as for QAD datapath cases. In one exemplary implementation, the rounders ability to detect the position of the msb and perform a right shift obviates the need to differentiate between rows 10 and 11 as well as 12 and 3. Thus, the datapath produces the correct result even if there is no intermediate circuitry such as a leading zeros counter on the intermediate result to detect the Norm Shift Error 305.

Exemplary Error Correction from Different Error Sources:

The following exemplary embodiments demonstrate normalization error correction processes for various sources of error in shift amount: from qualified addend dominated addition and subtraction, and from the LZA. While these exemplary concepts may apply to any precision of floating-point, the examples are in single precision. The following examples are simplified for illustrative purposes. Details of the carry-save formats and the carry propagation are abstracted such that the high level concepts may be more easily understood. The details of the rounder 218 are abstracted as well. In the following examples, a round-to-zero rounding mode is assumed. Lastly, the exponent math assumes an unbiased representation.

Error Correction of Addend-Dominated Addition (Carry) Errors:

In one embodiment, a "carry" operation may occur during addend dominated addition when the most significant bits (i.e., to the left of line 103 in FIGS. 1B and 1C) of an addend mantissa consist of zero or more 0s followed by zero or more "1s." This corresponds to row 4 of the table in FIG. 3A. In one exemplary embodiment, as illustrated in FIG. 4A, a fused multiply add (FMA) is represented by (A*B)+C, where:

A=1.000_0000_0000_0000_1111_0000*$2^{25}$
B=1.000_0000_0000_0000_0000_0000*$2^{35}$
C=1.111_1111_1000_0000_0000_0000*$2^{(25+35+8)}$.

Figure 4A:
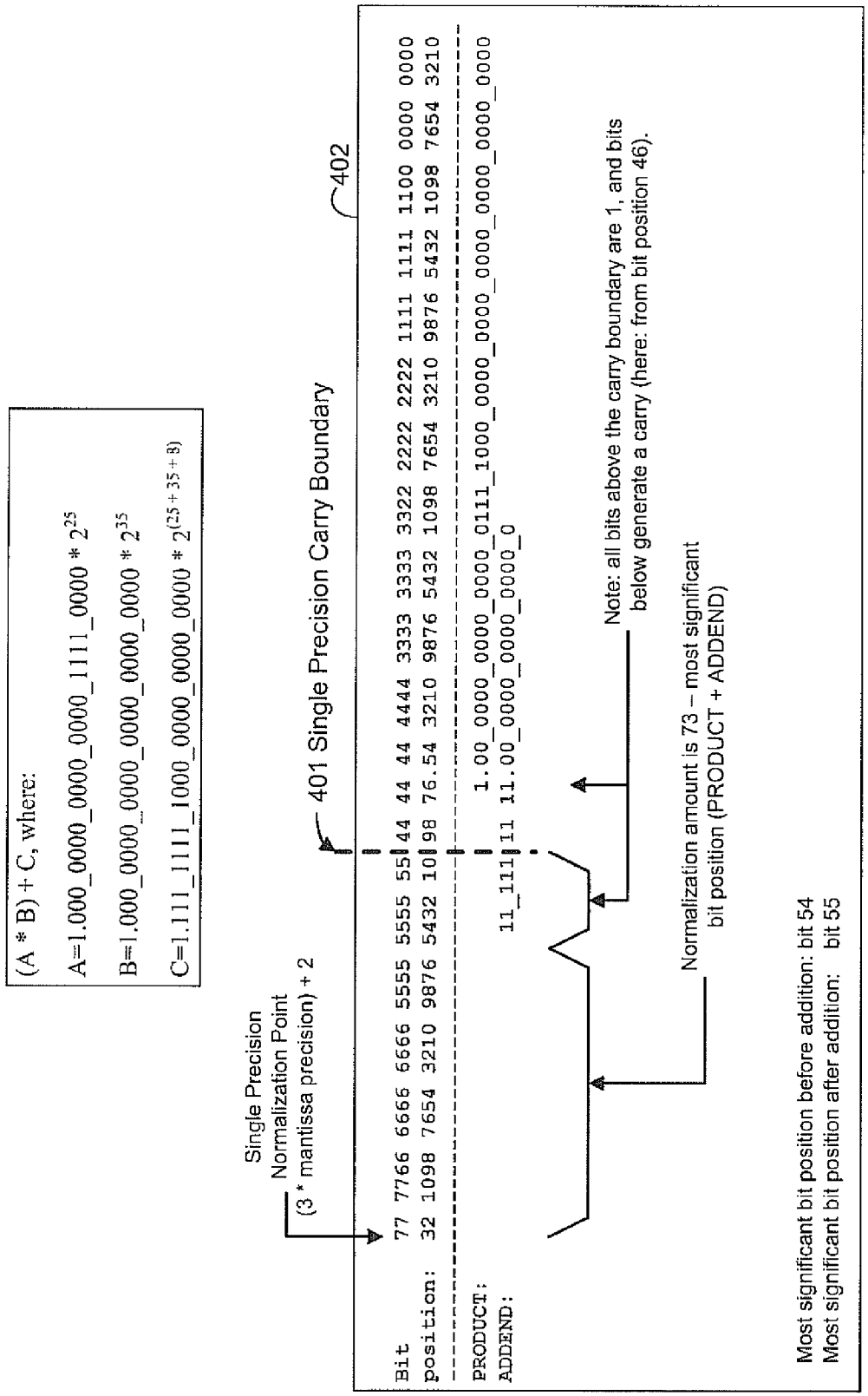

As illustrated in FIG. 4A and discussed below, a product of A*B is added to C. As discussed herein, FIGS. 4A and 4B abstract the details of carry-save format and summation order and present a simplistic illustration of the product and addend separately.

Note: the exemplary +8 from the exponent value for C causes an instance of the addend dominated scenario with sufficient overlap of mantissas for a carry to be generated. An aligned Product (PRODUCT) and Addend (ADDEND) are illustrated in box 402 of FIG. 4A. The top two rows labeled "Bit position" provide an exemplary bit position numbering in sequence from "73" to "00." As illustrated in box 402 of FIG. 4A, bit position "73" is a single precision normalization point. In one embodiment, the single precision normalization point is defined as (3*mantissa precision)+2. As also illustrated in box 402 of FIG. 4A, a line 401 between bit positions "50" and "49" is an exemplary single precision carry boundary.

As also illustrated in Box 402 of FIG. 4A, an exemplary normalization amount is 73 (maximum bit position)−most significant bit position (PRODUCT+ADDEND). In other words, the exemplary normalization amount in box 402 of FIG. 4A is 73−(the most significant bit position after the addition of the PRODUCT and ADDEND). In one exemplary embodiment, the most significant bit position before addition is "54," while the most significant bit position after addition is "55." In the exemplary process described herein, a normalization amount (e.g., a required quantity of left shifts) will not be determined after the addition, as performed by the completion adder 210. Exemplary embodiments that determine a normalization amount after addition will incur additional latency. As illustrated in FIG. 2, and discussed herein, a normalization amount based upon an estimated quantity of leading zeroes may be rapidly determined by the LZA 212 without waiting for the addition operation to complete.

Box 404 of FIG. 4B illustrates a summation of the PRODUCT and the ADDEND from Box 402 of FIG. 4A. Box 404 of FIG. 4B also illustrates that after summing the exemplary PRODUCT and the ADDEND mantissas, the most significant bit position of the summed mantissa value (labeled "SUM" in box 404 of FIG. 4B) is "55" (incrementing up from bit position "54" to "55" due to the carry operation).

Box 406 of FIG. 4B illustrates a normalization of the summed PRODUCT and ADDEND values (SUM, as illustrated in box 404). In this example, the normalization, following the process illustrated in row 4 of the table in FIG. 3A, will result in the most significant set bit, originally bit position "55," to be shifted to bit position "73." As illustrated in box 406 of FIG. 4B, the normalization results in a left shift of 18 bits. As discussed herein, the normalization process from row 4 of FIG. 3A (mant>>1, none), adjusts the normalization shift amount from the addend to 19-1. The exponent is also adjusted according to the following equation: r_exp(68)=prod_exp(25+35)−norm_amt(18)+radix_pt_movement(26)−adjustment(0). In this equation, r_exp corresponds to the result exponent value, prod_exp corresponds to the exponent of the product (A*B), norm_amt corresponds to the normalization shift amount from the leading zeros of the addend, radix_pt_movement corresponds to the difference in the radix point from the product of 46 to the normalized mantissa 72, and the adjustment comes from the exponent field of row 4 (or 3), column 306 of FIG. 3A.

As also illustrated in Box 408 of FIG. 4C, the rounding and error correction results in final mantissa and exponent values. As illustrated in box 408 of FIG. 4, the net effect of the rounding and error correction is a right shift of the mantissa and an exponent increment. As discussed above, the net impact, after the rounding and error correction is achieved through the pre-biasing, rounding, and normalization steps. For example, in accordance with row 4 of FIG. 3A, the pre-bias of the sixth column 306 is a right shift of the mantissa with no exponent change (mant>>1, none), and the rounder and normalization behavior of the seventh column 307 is no mantissa shift combined with an exponent increment to achieve the net result of a right shift and exponent increment. As discussed above, the no mantissa shift of the seventh column 307 is achieved by a right shift in the rounder 218.

Error Correction of Addend-Dominated Subtraction (Borrow) Errors:

In one embodiment, a "borrow" operation may occur during addend dominated subtraction when the most significant bits of an addend mantissa are a 1 followed by a string of "0s." This corresponds to row 6 of FIG. 3A. In one exemplary embodiment, as illustrated in FIG. 5A, a fused multiply add (FMA) is represented by (A*B)+C, where:

A=1.000_0000_0000_0000_1111_0000*$2^{25}$
B=1.000_0000_0000_0000_0000_0000*$2^{35}$
C=1.111_1111_1000_0000_0000_0000*$2^{(25+35−10)}$.

Figure 5A:
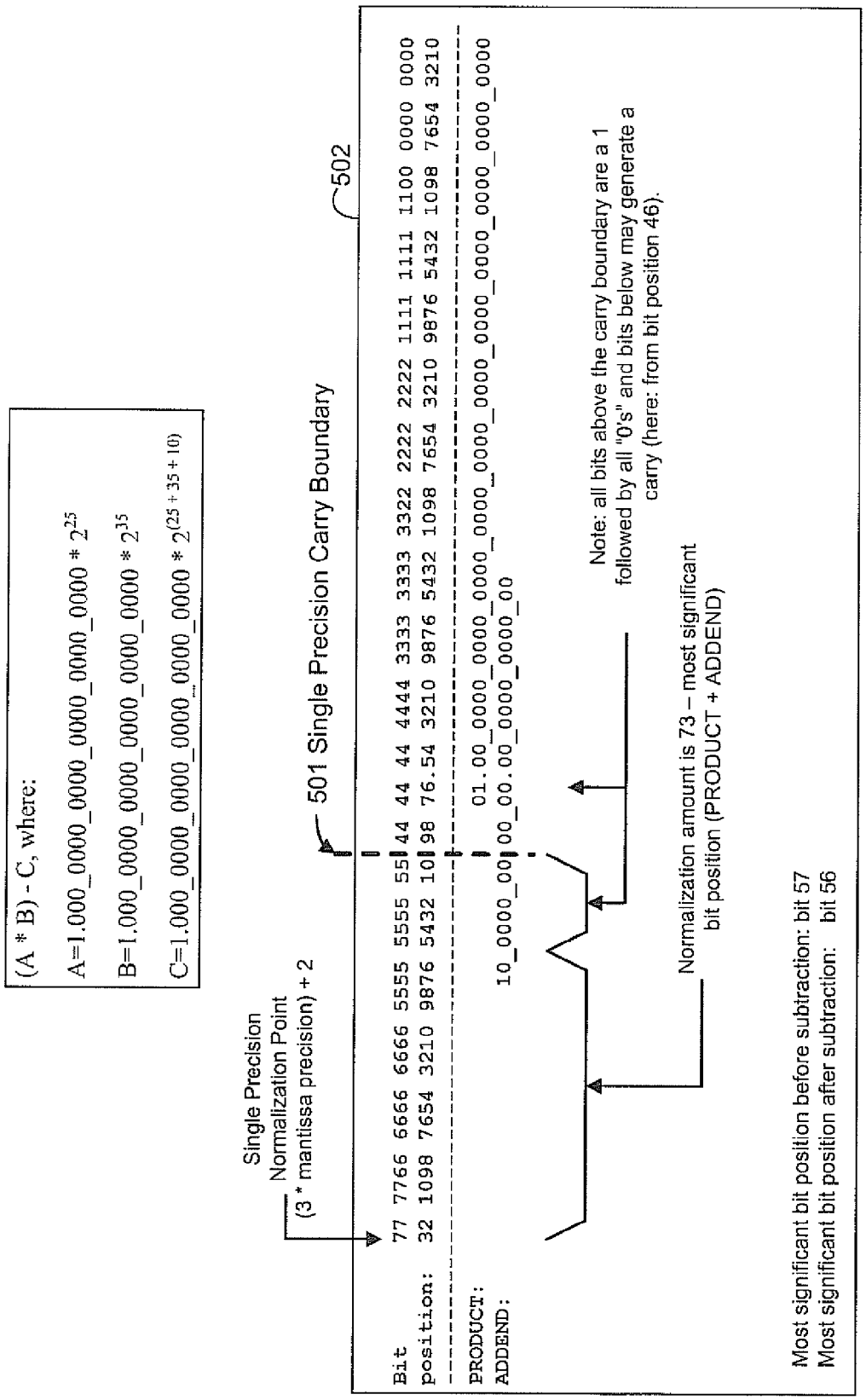

As illustrated in FIG. 5A and discussed below, addend C is subtracted from a product of A*B. As discussed herein, FIGS. 5A and 5B abstract the details of carry-save format and summation order and present a simplistic illustration of the product and addend separately.

Note: the exemplary +10 from the exponent value of C above is used to cause an instance of the addend dominated scenario with sufficient overlap of mantissas to require a borrow operation. An aligned product (PRODUCT) and addend (ADDEND) are illustrated in box 502 of FIG. 5A. The top two rows labeled "Bit position" provide an exemplary bit position numbering in sequence from "73" to "00." As illustrated in box 502 of FIG. 5A, bit position "73" is a single precision normalization point. In one embodiment, a floating-point precision normalization point is defined as (3*mantissa precision)+2. As also illustrated in box 502 of FIG. 5A, a line 501 between bit positions "50" and "49" is an exemplary floating-point precision carry boundary.

As also illustrated in Box 502 of FIG. 5A, an exemplary normalization amount is 73 (maximum bit position)−most significant bit position (PRODUCT+ADDEND). In other words, the exemplary normalization amount in box 502 of FIG. 5A is 73−(the most significant bit position after the subtraction of the ADDEND from the PRODUCT). In one exemplary embodiment, the most significant bit position before subtraction is "57," while the most significant bit position after subtraction is "56." In the exemplary process described herein, a normalization amount (e.g., a required quantity of left shifts) will be determined before the subtraction, as performed by the completion adder 210. Exemplary embodiments that determine a normalization amount after subtraction will incur additional latency. As illustrated in FIG. 2, and discussed herein, a normalization amount based upon an estimated quantity of leading zeroes may be rapidly determined by the LZA 212 without waiting for the subtraction operation to complete.

Box 504 of FIG. 5B illustrates a subtraction of the ADDEND from the PRODUCT from Box 502 of FIG. 5A. Box 504 of FIG. 5B also illustrates that after summing (subtracting) the exemplary PRODUCT and the ADDEND values, the most significant bit position of the summed value (labeled "SUBTRACTION RESULT" in box 504 of FIG. 5B) is "56" (decrementing down from bit position "57" to "56" due to the borrow operation).

Box 506 of FIG. 5B illustrates a normalization of the summed PRODUCT and ADDEND values (SUBTRACTION RESULT, as illustrated in box 504 of FIG. 5B). In this example, the normalization, following the process illustrated in row 6 of the table in FIG. 3A, will result in the most significant set bit, originally bit position "55," to be shifted to bit position "73." As illustrated in box 506 of FIG. 5B, the normalization results in a left shift of 16 bits. As discussed herein, the normalization process from row 6 of FIG. 3A (none, exp—), performs no shift adjustments and the normalization shift amount is from the addend before subtraction (e.g., 16 leading zeroes). The exponent is also adjusted according to: exponent value, r_exp(69)=prod_exp(25+35)−norm_amt(16)+radix_pt_movement(26)−adjustment(1).). In this equation, r_exp corresponds to the result exponent value, prod_exp corresponds to the exponent of the product (A*B), norm_amt corresponds to the normalization shift amount from the leading zeros of the addend, radix_pt_movement corresponds to the difference in the radix point from the product of 46 to the normalized mantissa 72, and the adjustment comes from the exponent field of row 6 (or 5), column 306 of FIG. 3A.

As also illustrated in Box 508 of FIG. 5C, the rounding and error correction results in final mantissa and exponent values. As illustrated in box 508 of FIG. 5C, the net effect of the rounding and error correction is a left shift of the mantissa and an exponent decrement. This is also illustrated in FIG. 3A in row 6 and column 308. As discussed above, the net impact, after the rounding and error correction is achieved through the pre-biasing, rounding, and normalization steps. For example, in accordance with row 6 of FIG. 3A, the pre-bias of the sixth column 306 is an exponent decrement with no mantissa shift (none, exp--), and the rounder and normalization behavior of the seventh column 307 is a mantissa left shift with no exponent adjustment, to achieve the net result of a left shift and an exponent decrement. As discussed above, the mantissa left shift of the seventh column 307 is achieved by performing no mantissa shift with the rounder 218.

Error Correction of Multiplication-Dominated Scenario (LZA-Induced) Errors:

In one exemplary embodiment, as illustrated in FIG. 6A, a product (PRODUCT) and addend (ADDEND) are aligned such that the upper 24 bits are zeroes (e.g., the bits above the single precision carry boundary will stay zero). In other exemplary embodiments, other floating-point precisions are utilized, such as double-precision, etc. This example corresponds to rows 1-2 of FIG. 3A. As illustrated in FIG. 3A, rows 1 and 2 correspond to scenarios where an operation is not addition dominated and a normalization error is produced by the LZA 212. In one exemplary embodiment, as illustrated in FIG. 6A, a fused multiply add (FMA) is represented by (A*B)-C, where:

A=1.000_0000_0000_0000_1111_0000*$2^{25}$
B=1.000_0000_0000_0000_0000_0000*$2^{35}$
C=1.111_1111_1000_0000_0000_0000*$2^{(25+35-1)}$.

Figure 6B:
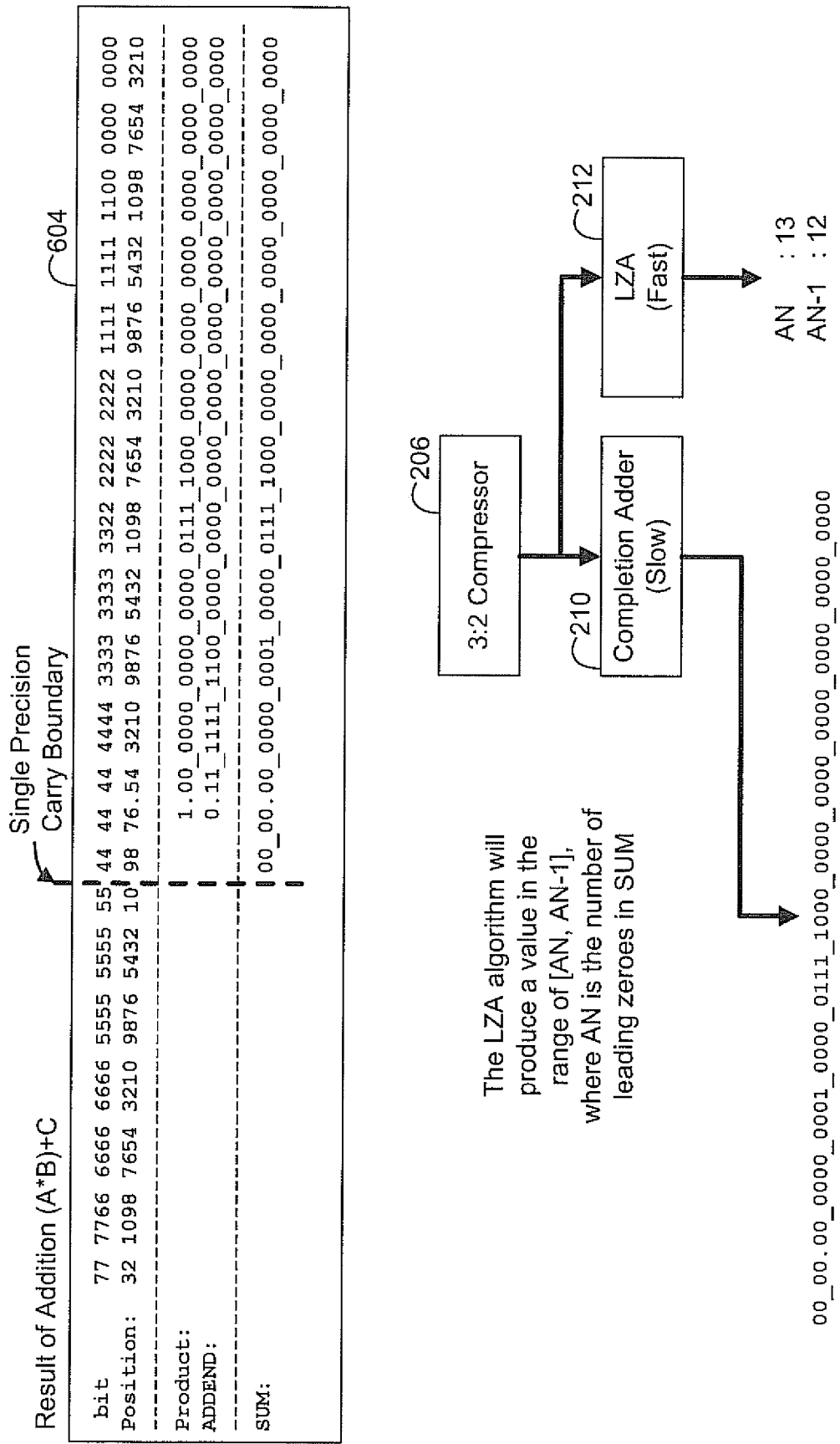

As illustrated in FIG. 6A and discussed below, addend C is subtracted from a product of A*B. As discussed herein, FIGS. 6A, 6B, 6C and 6D abstract the details of carry-save format and summation order and present a simplistic illustration of the product and addend separately As illustrated in FIG. 6B, exemplary 3:2 compressor outputs are input to both the completion adder 210 and the LZA 212. As discussed herein, the S and C outputs (from the product) are such that in this example there will be cancellation. As illustrated in FIG. 6B, and also discussed above, while the completion adder 210 output may be used to determine an actual quantity of leading zeroes used to determine a normalization shift quantity, waiting until after the completion adder 210 completes may take too long. In one exemplary embodiment, rather than waiting, an LZA 212 may be used to rapidly determine an estimated quantity of leading zeroes that are used to determine a normalization shift quantity.

However, as discussed herein, the normalization shift amount may be off by ±1 due to LZA error. Row 1 of FIG. 3A illustrates a scenario with no normalization error. Meanwhile, row 2 of FIG. 3A illustrates a scenario where a normalization error is -1. The scenario of row 1 is illustrated in FIG. 6C, while the scenario of row 2 is illustrated in FIG. 6D. The dataflow of row 1, where the normalization shift error=0, results in a net impact on the dataflow of no register shift and no exponent increment or decrement. The dataflow of row 2, where the normalization shift error=-1, results in a net impact on the dataflow of a left shift and an exponent decrement to correct for the shift error.

In one exemplary embodiment, LZA algorithms may produce a value in the range of (AN, AN+1) or (AN, AN-1), where AN is a number of leading zeroes in the summation result. Exemplary embodiments may handle either algorithm. In one exemplary embodiment, the LZA 212 produces L, or L-1, where L is a number of leading zeros in the summation result. In another embodiment, the LZA 212 may produce L, or L+1, where L is a number of leading zeroes in the summation result.

As illustrated in FIGS. 6C and 6D, an exemplary normalization shift amount is 24+ the LZA output (which may be 36 or 37, depending on the LZA algorithm), where the LZA output is 12 or 13. Box 606 of FIG. 6C illustrates a normalization of the summed PRODUCT and ADDEND values (SUM, as illustrated in box 604 of FIG. 6B), when the LZA 212 produces AN leading zeroes (while FIG. 6D illustrates an exemplary scenario where the LZA 212 produces AN-1 leading zeroes). In this example, the normalization, following the process illustrated in row 1 of FIG. 3A, will result in a most significant set bit, originally bit position "49," to be shifted to bit position "73." As illustrated in box 606 of FIG. 6B, the normalization results in a left shift of 37 bits and an exponent decrement of 1. As discussed herein, the normalization process from row 1 of FIG. 3A (none, exp—), performs no shift adjustments and the normalization shift amount is from the addend before subtraction (e.g., 13 leading zeroes). The exponent is also adjusted according to: exponent value, r_exp(48)=prod_exp(25+35)-norm_amt(37)+radix_pt_movement(26)-adjustment(1). In this equation, r_exp corresponds to the result exponent value, prod_exp corresponds to the exponent of the product (A*B), norm_amt corresponds to the normalization shift amount from the LZA, radix_pt_movement corresponds to the difference in the radix point from the product of 46 to the normalized mantissa 72, and the adjustment comes from the exponent field of row 1 (or 2), column 306 of FIG. 3A.

As also illustrated in Box 608 of FIG. 6C, the rounding and error correction results in a final result and final mantissa. As illustrated in box 608 of FIG. 6C, the net effect of the rounding and error correction is no mantissa shift and no exponent change, as the LZA output was correct. As discussed above, the net impact (that is, no change), after the rounding and error correction is achieved through the pre-biasing, rounding, and normalization steps. For example, in accordance with row 1 of FIG. 3A, the pre-bias of the sixth column 306 is an exponent decrement with no mantissa shift (none, exp--), and the rounder and normalization behavior of the seventh column 307 is an exponent increment with no mantissa shift (none, exp++), to achieve the net result of no mantissa shift and no exponent change (none, none). As discussed above, and illustrated in FIG. 6C, the no mantissa shift of the seventh column 307 is achieved by performing a mantissa right shift with the rounder 218.

Box 610 of FIG. 6D illustrates a normalization of the summed PRODUCT and ADDEND values (SUM, as illustrated in box 604 of FIG. 6B), when the LZA 212 produces AN-1 leading zeroes. In this example, a normalization, following the process illustrated in row 2 of FIG. 3A, will result in a most significant set bit, originally bit position "49," to be shifted to bit position "72." As illustrated in box 610 of FIG. 6B, the normalization results in a left shift of 36 bits and an exponent decrement of 1. As discussed herein, the normalization process from row 2 of FIG. 3A (none, exp--), performs no shift adjustments and the normalization shift amount is from the addend before subtraction (e.g., 12 leading zeroes). The exponent is also adjusted according to: exponent value, r_exp(49)=prod_exp(25+35)−norm_amt(36)+radix_pt_movement(26)−adjustment(1). In this equation, r_exp corresponds to the result exponent value, prod_exp corresponds to the exponent of the product (A*B), norm_amt corresponds to the normalization shift amount from the LZA, radix_pt_movement corresponds to the difference in the radix point from the product of 46 to the normalized mantissa 72, and the adjustment comes from the exponent field of row 1 (or 2), column 306 of FIG. 3A.

As also illustrated in Box 612 of FIG. 6D, the rounding and error correction results in a final result and final mantissa. As illustrated in box 612 of FIG. 6D, the net effect of the rounding and error correction is a left shift of the mantissa and an exponent decrement. As discussed above, the net impact, after the rounding and error correction is achieved through the pre-biasing, rounding, and normalization steps. For example, in accordance with row 2 of FIG. 3A, the pre-bias of the sixth column 306 is an exponent decrement with no mantissa shift (none, exp−−), and the rounder and normalization behavior of the seventh column 307 is a mantissa left shift with no exponent adjustment, to achieve the net result of a left shift and an exponent decrement. As discussed above, the mantissa left shift of the seventh column 307 is achieved by performing no mantissa shift with the rounder 218.

The use of the LZA allows an estimated calculation of the number of leading zeroes found in the addend so that a shift quantity for the normalization can be calculated. After the normalization is completed, depending on the type of error and the type of datapath, the error may be corrected at the same time as the rounding. As discussed above, the error correction and rounder may be performed by the rounder 218. As also discussed above, because of the pre-biasing steps, the normalization errors may be corrected by the rounder 218 internally performing a mantissa shift in only one direction (e.g., a right shift).

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method for correcting a shift error in a fused multiply add operation, the method comprising:
    adjusting a normalized floating-point number before performing a shift error correction to produce an adjusted normalized floating-point number; and
    correcting a shift error in the adjusted normalized floating-point number, wherein correcting the shift error comprises shifting a mantissa of the adjusted normalized floating-point number in one direction.

2. The method of claim 1, wherein the adjusting a normalized floating-point number comprises one of a mantissa shift and an exponent decrement of the normalized floating-point number.

3. The method of claim 1, wherein the shift error comprises one of a leading zero estimation error, an addend dominated addition error from a carry out operation, and an addend dominated subtraction error from a borrow operation.

4. The method of claim 3, wherein the adjusting a normalized floating-point number comprises transforming one of an addend dominated addition error and an addend dominated subtraction error into a leading zero estimation error, and wherein an adjustment for transforming an addend dominated addition error is different from an adjustment for transforming an addend dominated subtraction error.

5. The method of claim 1, wherein the shifting the mantissa of the adjusted normalized floating-point number in one direction comprises right shifting the mantissa of the adjusted normalized floating-point number, and wherein a rounder performs the mantissa right shift.

6. The method of claim 1, wherein the shifting the mantissa of the adjusted normalized floating-point number in one direction comprises shifting the mantissa of the normalized floating-point number 1 bit.

7. The method of claim 1 further comprising:
    rounding the adjusted normalized floating-point number, wherein the rounding of the adjusted normalized floating-point number and the correcting of the shift error of the adjusted normalized floating-point number are performed concurrently in a single step, and wherein the rounding and the correcting are performed by a rounder.

8. The method of claim 1, wherein a floating-point number comprises a floating-point number of any precision.

9. The method of claim 1, wherein an actual number of leading zeroes is not determined.

10. A fused multiply add module comprising:
    a normalizer module operable to normalize a floating-point number to produce a normalized floating-point number, wherein the floating-point number is normalized based upon an estimated quantity of leading zeros;
    a compensation logic operable to adjust the normalized floating-point number to produce an adjusted normalized floating-point number; and
    a rounder operable to correct the shift error with a mantissa shift in one direction.

11. The module of claim 10, wherein the rounder is operable to correct the shift error by performing a mantissa shift of the adjusted normalized floating-point number.

12. The module of claim 11, wherein the compensation logic is further operable to adjust the normalized floating-point number by one of a mantissa shift and an exponent decrement of the normalized floating-point number.

13. The module of claim 10, wherein the shift error comprises one of a leading zero estimation error, an addend dominated addition error from a carry out operation, and an addend dominated subtraction error from a borrow operation.

14. The module of claim 10, wherein the rounder is further operable to correct the shift error by right shifting the mantissa of the normalized floating-point number.

15. The module of claim 11, wherein the rounder is further operable to correct the shift error by right shifting the mantissa of the adjusted normalized floating-point number.

16. The module of claim 10, wherein the rounder is further operable to round the normalized floating-point number, and wherein further the rounder is operable to round the normalized floating-point number and concurrently perform the mantissa shift to correct the shift error.

17. The module of claim 10, wherein a floating-point number comprises a floating-point number of any precision.

18. The module of claim 10 further comprising:
    a leading zero anticipator operable to estimate a quantity of leading zeros in a floating-point number input to the normalizer, wherein a width of the leading zero anticipator is twice a width of an input mantissa.

19. The module of claim 10, wherein an actual number of leading zeroes is not determined.

20. A non-transitory computer readable storage medium comprising computer-executable instructions stored therein, the computer-executable instructions comprising:

instructions to adjust a normalized floating-point number before performing a shift error correction to produce an adjusted normalized floating-point number; and instructions to correct a shift error in the adjusted normalized floating-point number, wherein the instructions to correct the shift error comprise instructions to shift a mantissa of the adjusted normalized floating-point number in one direction.

21. The non-transitory computer readable storage medium of claim 20, wherein the instructions to adjust a normalized floating-point number comprise instructions to perform one of a mantissa shift and an exponent decrement of the normalized floating-point number.

22. The non-transitory computer readable storage medium of claim 20, wherein the shift error comprises one of a leading zero estimation error, an addend dominated addition error from a carry out operation, and an addend dominated subtraction error from a borrow operation.

23. The non-transitory computer readable storage medium of claim 22, wherein the instructions to adjust a normalized floating-point number comprise instructions to transform one of an addend dominated addition error and an addend dominated subtraction error into a leading zero estimation error, and wherein an adjustment for transforming an addend dominated addition error is different from an adjustment for transforming an addend dominated subtraction error.

24. The non-transitory computer readable storage medium of claim 20, wherein the instructions to shift a mantissa of the adjusted normalized floating-point number in only one direction comprise instructions to right shift the mantissa of the adjusted normalized floating-point number, and wherein a rounder performs the mantissa right shift.

25. The non-transitory computer readable storage medium of claim 20, wherein the instructions to shift a mantissa of the adjusted normalized floating-point number in one direction comprise instructions to shift the mantissa of the normalized floating-point number 1 bit.

26. The non-transitory computer readable storage medium of claim 20, the computer-executable instructions further comprising:

instructions to round the adjusted normalized floating-point number, wherein rounding of the adjusted normalized floating-point number and correcting of the shift error of the adjusted normalized floating-point number are performed concurrently.

27. The non-transitory computer readable storage medium of claim 20, wherein a floating-point number comprises a floating-point number of any precision.

28. The non-transitory computer readable storage medium of claim 20, wherein an actual number of leading zeroes is not determined.

* * * * *